United States Statutory Invention Registration [19]

[11] Reg. Number: H620

Young [43] Published: Apr. 4, 1989

[54] CONIFER GROWTH STIMULATION AND FOREST MANAGEMENT

[76] Inventor: Donald C. Young, 309 Jacaranda Pl., Fullerton, Calif. 92632

[21] Appl. No.: 119,638

[22] Filed: Nov. 12, 1987

Related U.S. Application Data

[63] Continuation of Ser. No. 793,699, Oct. 31, 1985, abandoned.

[51] Int. Cl.[4] ..... C05C 9/00; C05B 15/00

[52] U.S. Cl. ..... 71/28; 71/27; 71/30

*Primary Examiner*—John F. Terapane
*Assistant Examiner*—J. E. Thomas

[57] ABSTRACT

Conifer growth is stimulated by topical and/or foliar application of biuret which achieves direct contact of biuret with the conifer roots and/or foliage respectively. Foliar application is more effective on older trees. Optionally, undesired vegetation, such as ferns and broad-leaf plants, is controlled and conifer growth is promoted by application of biuret-containing solutions to the foliage of all plants. Novel compositions particularly useful in these methods contain biuret and a surfactant and/or polar solvent other than water sufficient to facilitate foliage wetting.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

CONIFER GROWTH STIMULATION AND FOREST MANAGEMENT

This application is a continuation of application Ser. No. 793,699, filed Oct. 31, 1985, and now abandoned.

BACKGROUND OF THE INVENTION

1. Field of the Invention

This invention relates to the field of conifer growth stimulation and forest management methods and compositions useful in such methods.

2. Description of the Art

Forest resource preservation and development becomes increasingly difficult as societies become more industrialized and affluent. The more developed the culture, the more destructive it becomes of its forests due to man-made calamities such as forest fires and to the consumption of forest products such as lumber and pulp. Paradoxically, expanding, affluent populations also demand more recreational areas for enjoyment of increased leisure time. Unfortunately, these conflicting demands occur at a time when the choicest, most productive soils are employed for agriculture or are occupied by industrial or residential structures. Consequently, silviculture is generally confined to remote areas in which soils are typically deficient in major and minor nutrients required for abundant plant growth.

Efforts to improve forest growth and maximize productivity have involved fertilization with either solid fertilizers or aqueous fertilizer solutions. Fertilization with solid nutrients usually involves application of urea, ammonium nitrate or other nitrogen source as relatively large solid prills of sufficient size to penetrate the forest canopy and reach the ground surface. A majority of nitrogen applied in this manner usually escapes by leaching or volatilization unless the nutrient is promptly washed into the soil and converted to nitrates (in the case of urea). Consequently, such practice is usually employed only during the rainy season and, thus, is logistically inefficient due to the intensity of effort required for wide spread fertilization in the few rainy months. Such practice also causes maximum ecological disruption since the fertilizer is applied at the time when it is most likely to contaminate forest streams and lakes. The use of solid fertilizer in this manner is inefficient for the further reason that much of the applied nitrogen is rapidly assimilated by shallow-rooted undergrowth such as ferns and broadleaf vegetation. More efficient foliar fertilization methods are described in my U.S. Pat. No. 4,033,747 for Silvicultural Fertilization and involve the application of concentrated nitrogen solutions directly to the forest canopy.

The presence of undesired vegetation such as ferns, weeds, and broadleaf trees and plants further complicates conifer forest management even in the absence of fertilization since such plants compete with conifer trees for nutrients and impair access to forested areas. Competition for nutrients, sunlight and water is particularly detrimental to conifer growth in reforested areas since broadleaf trees and underbrush typically grow much faster in their earlier stages of development than do conifer seedlings. Thus, broadleaf plants and other undergrowth can completely crowd out small conifer seedlings or markedly impair their growth rate unless the non-conifer species are controlled by mechanical or chemical thinning. One method for simultaneously fertilizing conifers and eliminating competing non-conifer growth is disclosed in U.S. Pat. No. 4,035,173 of S. Hashimoto and Donald C. Young, Selectively Thinning and Fertilizing Timber Forests, the disclosure of which is incorporated herein by reference in its entirety. That patent teaches, in part, that broadleaf plants can be selectively eliminated from preferred conifer trees by applying to the foliage of all plants an aqueous solution of a water-soluble nitrogen source having a nitrogen concentration corresponding to at least about 12.5 weight percent elemental nitrogen at a nitrogen dosage rate sufficient to kill a significant proportion of the broadleaf plants. Other chemical thinning methods usually involve herbicide application by ground personnel or vehicles, both of which are tedious, time consuming and expensive, as is mechanical thinning by ground personnel. Yet such procedures are sufficiently productive to justify their use. Mechanical clearing of undesired vegetation is sometimes practiced even as late as 15 years after planting and typically involves substantial costs on the order of $100.00 to more than $500.00 per acre. Yet the United States Forest Service has established that ultimate wood protection can be increased sufficiently to justify such practices.

Biuret is known to be highly phytotoxic to essentially all plant varieties when applied in a manner which provides direct contact with either plant foliage or roots. Biuret applied to the soil of deep rooted plants is generally less toxic since it is only slightly soluble in water (less than 2 weight percent at 25° C.) and is generally degraded in the soil before it can be assimilated by the plant. However, application of biuret directly to plant foliage or to shallow rooted plants, such as young seedlings, is known to produce dramatic phytotoxic response and often results in plant stunting or death. Many authorities flatly state that the biuret content of foliarly applied urea should not exceed 0.25 weight percent. See, for instance, the "Farm Chemicals Handbook," Meister Publishing Company., Willoughby, Ohio, 1981 under "Urea" and "LB Urea", and the "Western Fertilizer Handbook", 5th. Ed. Interstate Printers and Publishers, Inc., Danville, Ill., 1972, page 163. Paradoxically, biuret is often formed during the manufacture of urea, especially prilled urea—one of the most widely used nitrogen fertilizers. For that reason, various safeguards are built into modern urea manufacturing facilities to prevent biuret production, and various procedures have been devised for removing biuret from urea. Illustrative biuret-removal methods are discussed by Donald C. Young and James A. Green, II in Ser. No. 753,692 filed July 10, 1985 for Methods for Removing Biuret from Urea by Adsorption, now U.S. Pat. No. 4,701,555, Ser. No. 753,693 filed July 10, 1985 for Biuret Purification, now U.S. Pat. No. 4,698,443, Ser. No. 732,175 filed May 7, 1985 for Biuret Manufacture, now U.S. Pat. No. 4,645,860, Ser. No. 725,304 filed Apr. 19, 1985 for Methods for Purifying Biuret, now U.S. Pat. No. 4,645,859, Ser. No. 567,271 filed Dec. 30, 1983 for Methods for Removing Biuret from Urea by Ion Exchange, now U.S. Pat. No. 4,658,059, Ser. No. 567,099 filed Dec. 30, 1983 for Ion Exchange Methods for Removing Biuret from Urea, now U.S. Pat. No. 4,650,901 and Ser. No. 567,047, filed Dec. 30, 1983 for Methods for Removing Biuret from Urea, now U.S. Pat. No. 4,654,442 the disclosures of which are incorporated herein by reference in their entireties.

SUMMARY OF THE INVENTION

It has now been found that biuret is not phytotoxic to conifers even at very high per acre dosage rates, that biuret can be employed as both a topical and foliar fertilizer for conifers even in the absence of other nutrients, and that biuret applied directly to conifer foliage or roots at relatively low dosages increases growth by an amount greater than can be accounted for by increased nitrogen availability. Higher biuret dosage rates further increase conifer growth and can be employed to eliminate competing forest vegetation which is susceptible to biuret phytotoxicity. Significantly increased growth rate has been observed in redwood seedlings (*Sequoia sempervirens*) at dosage rates as high as 2,000 pounds of biuret per acre without any evidence of phytotoxicity. Novel compositions useful in these methods contain biuret and one or more surfactants or polar solvents other than water in the presence or absence of other components.

The methods and compositions of this invention increase conifer growth even at very low biuret dosage rates and, therefore, can be used to increase conifer growth with only minor nitrogen addition to the enviroment. Such practice is advantageous particularly in areas which already have adequate nitrogen availability. They can be employed to increase conifer growth even further by the addition of nitrogen sources other than biuret such as urea, ammonium nitrate, etc., and they can be used to eliminate competing non-conifer vegetation such as ferns and broadleaf trees and brush and thereby benefit conifer growth (due to the lack of competing varieties) and facilitate access to forested areas. The useful biuret-containing compositions cause less nitrogen runoff into streams and lakes due to biuret's low solubility, and they result in less loss, and therefore more efficient use, of nitrogen. Biuret's immunity to enzymatic action and volatilization (in contrast to urea) improves the efficiency of these methods and compositions even further.

DETAILED DESCRIPTION OF THE INVENTION

Conifers which can be treated with the described methods and compositions include all members of the order Coniferales of evergreen trees and shrubs. Timber trees are of greatest commercial significance and are generally selected from the family Pinaceae, commonly known as the "pine" family, which includes several genera, each of which encompasses numerous species. The generic classes within the pine family which constitute the principal commercial timber and wood by-product crops are the Abies, including all of the true firs such as Pony fir, Grand fir, Red fir, etc.; Picea, including numerous species of spruce; Pinus, including many species of pine such as loblolly, ponderosa, lodgepole, white pine, etc.; Pseudotsuga or false hemlock, the Douglas fir being a member of this genus rather than a true fir; Tsuga, including numerous species of hemlock; and Sequoia, including the species sempervirens and gigantia. The remaining two pine family genra, while generally being of lesser commercial importance within the context of this invention, are still suitable subjects for treatment with the described methods and compositions. Those include the genus Cedrus including all species of cedar and the genus Larix including the tamaracks.

The described methods and compositions can be employed to eliminate and control a wide variety of non-coniferous forest vegetation such as ferns and broadleaf trees, brush and vines. Illustrative broadleaf varieties are the Maple genus including numerous species of maples, the Birch genus including the common birch and alders, the genus Populus including poplars, and the Beech genus including numerous varieties of oaks and other species. Low lying broadleafs include numerous varieties of weeds, vines, and bushes such as ferns, i.e., the class Filicineae, running or climbing vines such as wild grapes, so-called arrowroot plants of the genus Maranto, wild flowering plants such as thistles and goldenrod and the numerous wild shrubs generally referred to as brush and characterized as woody plants having several permanent stems rather than a single trunk.

The compositions useful in these methods contain sufficient biuret to promote the growth of conifers, and, optionally, they contain sufficient biuret to inhibit the growth of non-coniferous plants growing in the treated vicinity. Such compositions can be either solid or liquid, although liquid compositions are particularly preferred, as is foliar application. Solid compositions can be applied to relatively young trees, i.e. trees 5 or less, generally 3 or less years old, and particularly potted seedlings which have shallow root systems that enable direct contact of the root system with biuret applied to the soil. Soil-applied biuret can be washed into the root zone of such shallow-rooted plants before it is decomposed by soil bacteria.

Typically, the biuret concentration will be sufficient to account for at least about 0.5, generally at least about 1 and preferably at least about 2 percent of the total nitrogen present in the composition. Higher biuret concentrations are preferred when lower total nitrogen dosage rates are required, as is the case when nitrogen availability is already sufficient to support adequate growth. In such instances, the biuret concentration will correspond to at least about 5, preferably 10 to about 100, and most preferably 20 to about 100 percent of the total nitrogen present in the composition. Most often, biuret concentration will account for about 2 to about 100 percent of total nitrogen.

The useful liquid compositions (as applied either to the ground or foliage) will contain about 0.05, generally at least about 0.1, and preferably at least about 1 weight percent biuret dissolved in sufficient liquid (water or other solvent) to enable adequate distribution. Typically biuret concentrations in the useful liquids will be from about 0.1 weight percent to the biuret solubility limit under application conditions. Biuret is more soluble in urea solutions, and its solubility increases as temperature is increased. Thus, higher biuret concentrations can be achieved by employing relatively concentrated urea solutions, i.e. solutions containing 10 to 60 weight percent urea, and elevated temperatures, i.e. up to about 60° C. The useful solid compositions usually contain about 1 to about 100 weight percent biuret.

The liquid compositions are preferably aqueous solutions or dispersions although other non-aqueous polar solvents or combinations of water and such solvents can also be employed. Such solutions and dispersions are preferably sufficiently concentrated to enable delivery of the desired biuret dosage rate without runoff from plant foliage. Typical application rates correspond to about 200 gallons per acre or less.

Biuret dispersions are especially useful for applying high biuret dosage rates in limited quantities of liquid, particularly in the absence of components, such as urea, which increase biuret solubility. Typically, such dispersions contain about 5 to about 75 weight percent finely divided (e.g., minus 100 mesh) biuret, about 0.5 to about 10 weight percent suspending agent, and about 0.25 to about 2 weight percent surfactant. Illustrative surfactants are defined herein after. Illustrative suspending agents are clays such as bentonite and kieselguhr, and natural and synthetic water-soluble polymers such as carboxymethylcellulose, polyamides, alganates, etc.

Conifer growth rate can be increased even more by the addition of other nitrogen sources such as urea, ammonium nitrate, ammonium phosphate, ammonium sulfate, etc. Thus, when it is not necessary to limit total nitrogen dosage, the applied liquids preferably contain at least about 5, generally at least about 10 and most preferably about 30 weight percent total nitrogen dissolved in a suitable solvent, preferably water. Suitable nitrogen-containing solutions are discussed in more detail in my U.S. Pat. No. 4,033,747 the disclosure of which is incorporated herein by reference in its entirety.

The useful solid compositions can consist essentially of biuret or can be mixtures of biuret and other nitrogen sources or fillers such as clay. Such compositions are preferably applied to forest areas in the form of prills of sufficient size to penetrate the forest canopy. However, they can also be applied to the foliage or soil surface as powders which adhere to the foliage and enter the plant due to the accumulation of moisture and dissolution of biuret on the foliage surface.

The novel solid and liquid compositions contain sufficient biuret to promote conifer growth, and optionally, inhibit the growth of non-coniferous plants, and one or more surfactants and/or polar solvents other than water. The biuret usually accounts for at least about 2, preferably at least about 5 and most preferably about 10 to about 100 percent of the total nitrogen contained in the composition. The most preferred compositions are aqueous solutions of urea and biuret in which the biuret-/urea weight ratio is at least about 0.02, preferably at least about 0.05 and most preferably at least about 0.1. The higher biuret/urea weight ratios are particularly preferred when low total nitrogen dosage rates are required.

The surfactants and polar solvents other than water facilitate foliage wetting and solution distribution and thereby promote rapid assimilation of biuret (and other dissolved components if present) by both conifers and non-coniferous plants. Relatively minor surfactant concentrations are usually sufficient and correspond to at least about 0.1 weight percent, generally about 0.1 to about 2.5 weight percent, and typically about 0.25 to about 1 weight percent. Similar or higher concentrations of polar solvents other than water can be employed. Thus, the biuret (and other components when present) can be dissolved in water containing 0.5 weight percent of a polar solvent other than water, or the solvent can consist essentially of a non-aqueous polar material such as aldehydes such as formaldehyde, propionaldehyde, etc., ketones such as methylethylketone, alcohols such as isopropanol, organic acids such as acetic, butyric, propionic, etc., amines, amides, thiols, and other polar compounds and combinations of such compounds. A variety of surfactants is useful in this embodiment, including cationic, anionic and nonionic surfactants and combinations of these. Illustrative classes of suitable surfactants are fatty amines, alkarylamines, fatty amides, quaternary alkyl and aryl ammonium salts and hydrates, quaternary ammonium bases of fatty amines and disubstituted diamines, fatty acid sulfonates, sulfonated fatty amides, amides of amino sulfonic acids, alkylaryl sulfonates and the like. Illustrative nonionic surfactants include poly-ethylene oxide condensates with hydrophobic groups having reactive hydrogens. These hydrophobic groups can have from about 8 to about 25 carbons and from about 2 to 15 molecular weights of the hydrophilic group. The hydrophobic groups can be selected from a variety of organic compounds having 1 or more reactive hydrogens including fatty alkyl or alkenyl alcohols, fatty acids, amines and amides, esterified hexitans or alkenyl phenols. The hydrophilic groups can be ethylene oxide moieties or groups such as ethylene chlorohydrin or polyethylene glycol. Still other illustrative surfactants include the organic substituted ammonium salts of sulfodicarboxylic acids that are reacted with various hydrophobic groups such as fatty amides having 12 to 18 carbon atoms to produce half amides in the manner described in U.S. Pat. No. 2,976,209 the disclosure of which is incorporated herein in its entirety. Other materials of this type are described in U.S. Pat. Nos. 2,976,211, 3,080,280 and 2,976,208, the disclosures of which are incorporated herein by reference in their entireties. The solid and liquid compositions may also contain other ingredients such as macronutrients, micronutrients, insecticides, fungicides and/or herbicides which are selective toward non-coniferous vegetation and are not significantly phytotoxic to conifers.

The liquid compositions can be obtained by dissolving biuret and other components, if present, in water or other solvent. Surfactants, polar solvents other than water, nutrients, herbicides, insecticides, etc., can be added in any order of mixing. Biuret can be obtained by any one of a variety of procedures including pyrolysis and selective crystallization as disclosed by Shipley and Watchorn in British Patent No. 1,156,099 and by Kaasenbrood in U.S. Pat. No. 3,185,731 the disclosures of which are incorporated herein in their entireties. Particularly useful methods for obtaining biuret from urea are disclosed by James A. Green, II and Donald C. Young in above-referenced copending applications Ser. No. 725,304, now U.S. Pat. No. 4,645,859, Ser. No. 732,175, now U.S. Pat. No. 4,645,860, and Ser. No. 753,693, now U.S. Pat. No. 4,698,443.

Conifer growth can be stimulated by contacting the foliage or roots of conifers with one or more of the described solid or liquid biuret-containing compositions at a biuret dosage rate sufficient to promote conifer growth. Very minor biuret dosage rates on the order of 0.05 pounds per acre produce a beneficial effect. However, higher biuret dosage rates usually produce greater growth enhancement and are therefore preferred. Thus, biuret dosage rates are usually at least about 0.1, preferably at least about 1 and most preferably at least about 10 pounds of biuret per acre. Even higher biuret dosages, i.e. 20 pounds per acre and more, increase conifer growth even further. Redwood seedlings approximately 6 inches high were treated with biuret at a dosage rate corresponding to 2,000 pounds of biuret per acre applied topically without any detectable phytotoxic effect. As a general rule, biuret dosage rates will be within the range of about 1 to about 5,000 pounds of biuret per acre.

In addition to the paradoxical nutrient effect of biuret on conifers, it has further been observed that the growth enhancement realized by biuret applications at relatively low dosage rates, i.e. 0.1 to about 2 pounds per acre, exceeds the growth enhancement observed by application of other nitrogen fertilizers at identical nitrogen dosage rates by a factor of 2 or more. Thus, threshold quantities of biuret enhance conifer growth to an extent which cannot be explained on the basis of nitrogen content alone. Without intending to be constrained to any particular theory or mechanism of operation, it presently appears that such threshold quantities of biuret behave as plant growth regulants at least to the extent that they promote conifer growth by an amount far greater than that attributable to nitrogen contribution per se. This appears to be particularly true when the biuret is foliarly applied, especially on mature conifers, e.g. 5 years old or more.

Since the biuret must be contacted with the plant foliage or roots in order to exhibit its maximum growth potentiating effect, the topical application of the solid compositions is usually effective only on shallow rooted trees which are about 5 years old or less, preferably about 3 years old or less. Topical application to seedlings about 2 years old or less has demonstrated significant growth increase with only minor biuret dosage rates. Application of the powdered compositions to plant foliage is effective provided that sufficient moisture is available in the atmosphere for absorption by the powder to dissolve biuret which then penetrates the plant foliage. Otherwise, foliar application of the liquid compositions is preferred, and such compositions can be applied at any growth stage of the treated conifers.

Selective elimination of competing non-coniferous growth is preferably accomplished by foliar application of the useful solutions at biuret dosage rates sufficient to completely eliminate such vegetation. While any significant control of undesired vegetation has a beneficial effect on the conifer crop, the biuret dosage rates typically are sufficient to eliminate at least about 50 percent, preferably at least about 70 percent of the non-coniferous vegetation. Biuret dosages sufficient to eliminate a significant proportion of competing vegetation will usually be at least about 1, generally at least about 5, preferably at least about 10, and most preferably at least about 20 pounds of biuret per acre.

It is sometimes desirable to eliminate non-coniferous species (or at least retard the growth of a significant portion of such species) without adding significant amounts of nitrogen to the envirorment. This is particularly true when nitrogen is already in plentiful supply. In such instances, the biuret will constitute at least about 5, generally at least about 10 and preferably at least about 20 percent of the total applied nitrogen. As a general rule, selective elimination of non-coniferous species is achieved by the use of compositions in which biuret constitutes about 5 to 100 percent of the applied nitrogen. Compositions in which biuret constitutes 10 to 100 percent of available nitrogen are particularly desirable for areas of high nitrogen availability. The described novel compositions which contain one or more surfactants and/or polar solvents other than water are particularly preferred for the selective elimination of non-coniferous plants.

The solutions can be applied by hand spraying or mechanical spraying from land vehicles or can be aerially applied by helicopter or other aircraft. The amount of solution applied will generally be determined by the desired solution concentration and the total dosage level. These application rates usually correspond to about 15 to about 200, preferably about 25 to about 100 gallons of solution per acre. A second consideration involves the amount of solution required to sufficiently cover the foliage and distribute the compounds without substantial drainage from the foliage to the forest floor. Such drainage is preferably avoided since less benefit is achieved by applying the useful compositions to the forest floor, especially in mature forests, and such application may result in contamination of ground water and adjacent rivers and streams.

The compositions are preferably applied annually, although more frequent applications such as semi-annual or quarterly treatments can be used. Applications are preferably made shortly before or during the active growing season, e.g., in the early or late spring, so that the greatest growth advantage is achieved. Similarly, non-conifers, e.g. broadleafs, are more effectively inhibited during the active growing season due to the higher foliage levels during that period.

The invention is further described by the following examples which are illustrative of specific modes of practicing the invention and are not intended as limiting the scope of the invention as defined by the appended claims.

EXAMPLE 1

Approximately 2.5 kg. of Tumwater fine sandy loam (pH 5.5) were placed in each of 384 2.5-liter plastic pots. Following random assignment to either Douglas-fir or western hemlock, each pot was sown in early May with 10 previously stratified seeds of the assigned species. The pots were kept in a greenhouse where extremes of soil temperature were moderated by surrounding the pots with peat moss that was periodically moistened. Soil within the pots was maintained near field capacity by periodic watering. Approximately 16 hours of light per day were provided by seasonally using artificial light. Greenhouse temperatures were maintained between 10° and 32° C. Three months after sowing, all seedlings were thinned to 5 per pot to achieve uniform spacing and height; then 24 different treatments were randomly assigned to different pots of each species. Ther were 8 replicates of each test.

The 24 fertilizer treatments on each species were arranged as a $4\times2\times3$ factorial testing 4 levels of biuret (0, 0.224, 2.24, and 22.4 kg. $ha^{-1}$), 2 methods of application (biuret applied as solution to either the soil or sprayed on the foliage), and 3 levels of nitrogen (0, 84 or 168 kg. $ha^{-1}$ as urea). The 48 treatment $\times$ species combinations were initially replicated eight times. All solutions were prepared from reagent-grade urea or biuret and were first applied when the 2-month old Douglas-fir were 2 to 6 cm. tall and the hemlock were 1 to 2 cm. tall.

After the first growing season, four of the 8 replicates were randomly selected for harvest and designated as Example 1. The remaining replicates were designated as Example 2 reported below.

Oven-dry weights of all harvested roots, tops and the combination of these were determined by drying to constant weight at 105° C. Average seedling weight per pot was determined on the basis of the number of surviving seedlings per pot; i.e. 5 for almost all pots. The results were analyzed for variance using orthogonal polynomials to establish regressions for average seedling weight per pot versus total nitrogen or biuret dosage. These results established that total seedling weight increased linearly with biuret dosage for all treatments up to a maximum of 14 percent gain for the biuret-treated seedlings compared to biuret-free treatments. In this experiment, topical biuret application consistently produced more weight gain than did foliar application. However, the comparison of topical and foliar application in this experiment was complicated by solution runoff in foliar applications, the very shallow roots of small seedlings and the high permeability of the test soil. All of these factors may have combined to provide a degree of direct biuret contact with seedling roots far greater than that which could occur with topical application in a normal forest situation.

Comparison of total weight gains for all treatments and both tree species established that biuret was from 2 to 1,110 times more effective than urea as a nitrogen source depending on tree species and treatment. In other words, the total weight gain observed as a result of biuret-nitrogen application ranged from 2 to 1,110 times greater than that which occurred as a result of urea-nitrogen application based on each unit of applied nitrogen.

EXAMPLE 2

The four replicates of each test in Example 1 which were not harvested in that example were rethinned to leave three seedlings per pot and were retreated with biuret, urea or a combination of these, before the second growing season. Retreatments in each pot corresponded to the original treatment for that pot. Thus, the experimental design of this example was the same as in Example 1. Seedlings of this example were tended during the second growing season as described in Example 1.

At the end of the second growing season, all plants were harvested and evaluated as described in Example 1. Total weight increased linearly with biuret dosage for all treatments. The maximum weight gain for the biuret treatments was 14 percent higher (total dry weight) than for the biuret-free treatments. Expressed in terms of nitrogen efficiency, biuret produced about 2 to 310 times the total weight gain per nitrogen dose as did biuret-free urea depending on tree species and urea-biuret dose. In other words, the total weight gain associated with nitrogen dose ranged from 2 to 310 times higher for biuret-nitrogen than for urea-nitrogen even though urea significantly increased seedling total dry weight.

While particular embodiments of this invention have been described, it will be understood, of course, that the invention is not limited thereto since many obvious modifications can be made, and it is intended to include within this invention any such modifications as will fall within the spirit and scope of the appended claims.

I claim:

1. A method for promoting the growth of conifers which comprises applying to said conifers an amount of biuret sufficient to promote the growth of said conifers.

2. The method defined in claim 1 wherein said biuret is applied to the foliage of said conifers.

3. The method defined in claim 1 wherein said biuret is applied to the foliage of said conifers as a liquid solution or dispersion.

4. The method defined in claim 1 wherein said biuret is applied to said conifers as an aqueous solution comprising a member selected from the group consisting of surfactants, polar solvents other than water, and combinations thereof.

5. The method defined in claim 1 wherein said biuret is applied to said conifers at a rate corresponding to at least about 0.1 pound of biuret per acre.

6. The method defined in claim 1 wherein said biuret is applied to said conifers at a rate corresponding to at least about 1 pound of biuret per acre.

7. The method defined in claim 1 wherein said biuret is applied to said conifers at a rate corresponding to at least about 10 pounds of biuret per acre.

8. The method defined in claim 1 wherein said biuret is applied to said conifers in a composition comprising a plant nutrient in addition to said biuret.

9. The method defined in claim 1 wherein said biuret is applied to said conifers in a composition further comprising a compound selected from the group consisting of urea, ammonium and potassium sulfates, nitrates, phosphates, and combinations thereof.

10. The method defined in claim 1 wherein said biuret is applied to said conifers in a composition which further comprises urea.

11. The method defined in claim 1 wherein said biuret is applied to said conifers in a composition which further comprises urea, and the biuret/urea weight ratio is at least about 0.02.

12. The method defined in claim 1 wherein said biuret is applied to said conifers in a composition which further comprises urea, and the biuret/urea weight ratio is at least about 0.05.

13. The method defined in claim 1 wherein said biuret is applied to said conifers in a composition which further comprises urea, and the biuret/urea weight ratio is at least about 0.1.

14. The method defined in claim 1 wherein said biuret is applied to said conifers at a rate corresponding to about 0.1 to about 20 pounds per acre, and said conifers are about five years old or less.

15. The method defined in claim 1 wherein said conifers comprise commercial timber trees of the family Pinaceae.

16. The method defined in claim 1 wherein said conifers comprise trees selected from the group consisting of the genra Abies, Sequoia, Picea, Pinus, Pseudotsuga, Tsuga, and combinations thereof.

17. The method of claim 1 wherein said conifers are selected from the group consisting of Grand fir, Red fir, Pony fir, hemlock, spruce, cedar, loblolly pine, Ponderosa pine, lodgepole pine, white pine, sequoia sempervirens, and combinations thereof.

18. The method defined in claim 1 wherein said biuret is applied to the foliage of said conifers as an aqueous solution in which the biuret/urea weight ratio is at least about 1.

19. The method defined in claim 1 wherein said biuret is applied to the foliage of said conifers as an aqueous solution comprising at least about 5 weight percent urea in which the biuret/urea weight ratio is at least 0.05.

20. The method defined in claim 1 wherein said conifers are growing in the presence of non-coniferous plants, and said biuret is foliarly applied to said conifers and said non-coniferous plants at a dosage rate sufficient to inhibit the growth of said non-coniferous plants.

* * * * *